United States Patent [19]

Murray et al.

[11] Patent Number: 4,637,761
[45] Date of Patent: Jan. 20, 1987

[54] AUTOMATED TOOL POSITIONING SYSTEM

[75] Inventors: William J. Murray, Midlothian; George A. Earle, III, Dallas, both of Tex.

[73] Assignee: LTV Aerospace and Defense Company, Dallas, Tex.

[21] Appl. No.: 590,905

[22] Filed: Mar. 19, 1984

[51] Int. Cl.$^4$ .......................... B23B 49/00; B23C 1/12
[52] U.S. Cl. ...................... 408/16; 29/26 A; 409/199; 409/216
[58] Field of Search .................. 29/26 A; 408/3, 16, 408/88, 234; 409/107, 201, 211, 216, 199

[56] References Cited

U.S. PATENT DOCUMENTS

| | | | |
|---|---|---|---|
| Re. 26,393 | 5/1968 | Daugherty | 408/234 X |
| 3,435,532 | 4/1969 | Brasier | 408/16 X |
| 3,559,529 | 2/1971 | Vertin | 409/117 |
| 3,605,909 | 9/1971 | Lemelson | 408/3 |
| 3,650,178 | 3/1972 | Appleton | 409/201 X |

FOREIGN PATENT DOCUMENTS 2428492 2/1980 France ................... 409/201

*Primary Examiner*—Eugene F. Desmond
*Attorney, Agent, or Firm*—J. M. Cate; S. S. Sadacca

[57] ABSTRACT

An automated tool positioning system is disclosed. The system includes a plurality of work stations, each having a set of guide rails disposed along the length thereof. A single control device is provided and includes a set of guide rails adapted to be temporarily aligned with the guide rails of each work station. The control device is thus movable from work station to work station and operates with a novel tool support member which may be selectively positioned along any guide rail to support a cutting tool at a selected position on a particular work station. The tool support member includes arcuate bearing surfaces which permit the cutting tool to be rotated through a conical section having its vertex at the cutting point of the tool in response to the output of a workpiece surface detection circuit. In this manner, the cutting tool may be automatically and accurately positioned normal to the contoured surface of the workpiece.

3 Claims, 6 Drawing Figures

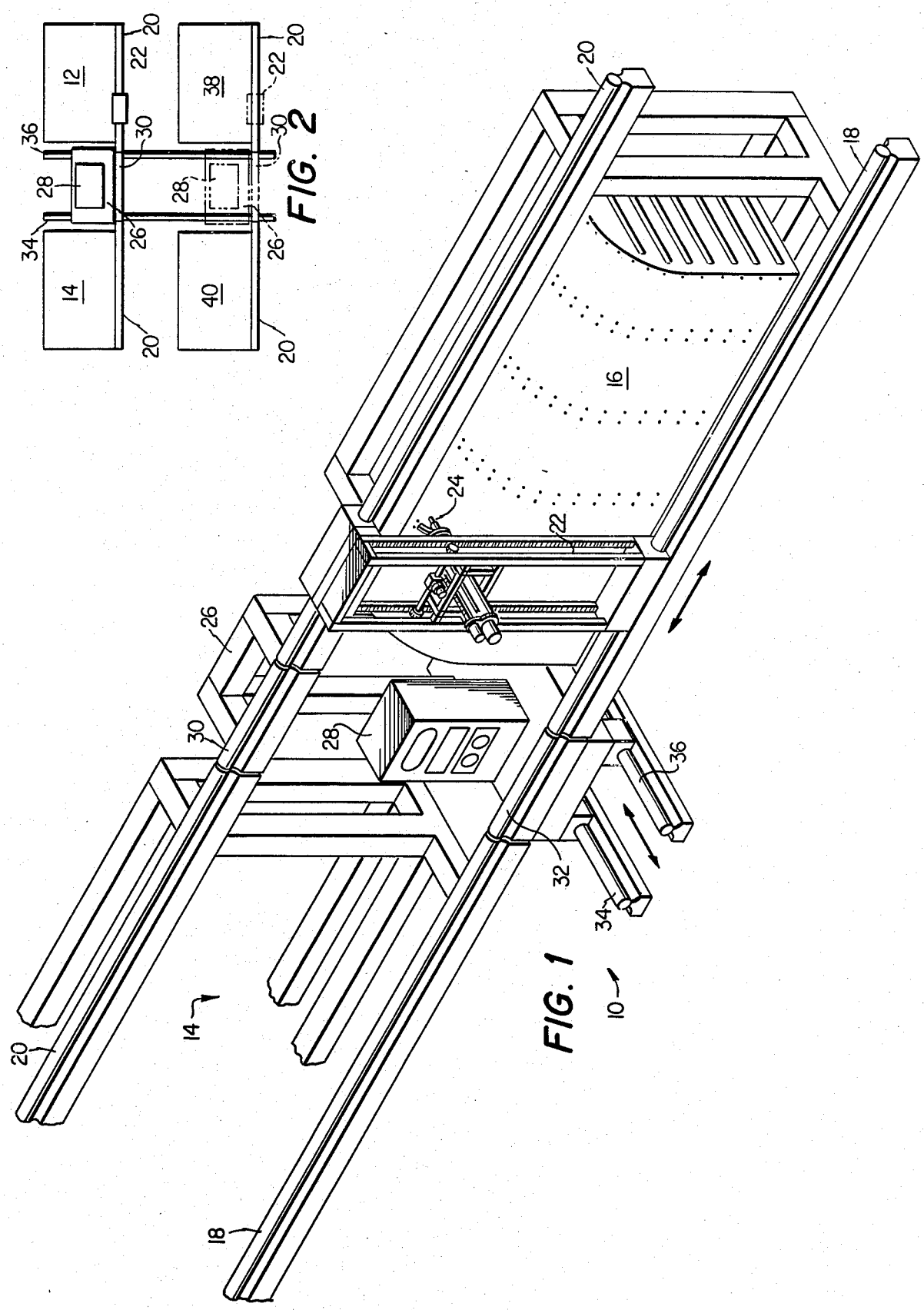

AUTOMATED TOOL POSITIONING SYSTEM

BACKGROUND OF THE INVENTION

A significant cost factor in the manufacture of aircraft structures involves the preparation of holes to accept the wide variety of screws, rivets and other fasteners utilized in aircraft fabrication. It is not uncommon for over one million holes to be required in the manufacture of a large aircraft and this particular task represents a major portion of the production cost. In recent years improvements have been made in automating various processes in the aircraft manufacturing industry; however, the application of these automated techniques to the drilling of contour shaped subassemblies has sadly lagged.

A major problem involved in known attempts to automate the drilling and riveting equipment necessary for aircraft manufacture involves the fact that this drilling must be performed in assembly fixtures on the production floor. Typically, these drilling operations are currently performed manually because the equipment and controls necessary to realize an automated system which possesses the necessary complexity to operate on a contour structure have not yet been developed. Such a system must be capable of operating in five axes of motion in order to properly drill contoured skins of aircraft structure, since each hole must be drilled with the cutting tool normal to the contour at the point of entry. Further, such a system must be able to automatically adjust to ensure that the cutting implement is normal prior to penetration. Such a system would greatly reduce manufacturing costs on both metal and composite structures and result in a significant cost saving in the manufacture of large and small aircraft.

Recently, an automated drilling system has been disclosed in U.S. Pat. No. 3,973,859, issued to Huber et al. The Huber et al system teaches an automated technique for drilling compound curvature workpieces which are secured in a fixture by first scanning the workpiece with an optical camera to detect possible position variations. The optical camera is then removed and replaced with a tool manipulator head which includes a spherical bearing mounted between the cutting element and the nonworking end of the cutting tool. By manipulating the nonworking end of the cutting tool the cutting element can be rotated through an angular motion. However, since the rotational point for such manipulation lies at a point between the nonworking end of the cutting tool and the cutting element, the accuracy necessary for many aircraft operations is not available. Further, the complexity needed to calculate the position of the cutting element is increased due to the necessity of constantly calculating such position in view of the ratio of the distance between the manipulator and the spherical bearing and the distance between the spherical bearing and the surface of the workpiece.

A more reasonable approach to the problem of automated drilling operations is found in multi-axis numerically controlled or computer controlled drilling systems. However, prior art systems which incorporate computerized numerical control have generally been highly expensive, fragile and difficult to hold in a proper position. Therefore, it should be apparent, that a need has existed for a computerized numerically controlled drilling system which may be simply and accurately operated in five axes of motion and which may be easily held in a proper position once that position is obtained.

SUMMARY OF THE INVENTION

It is therefore one object of the present invention to produce an improved automated tool positioning system.

It is another object of the present invention to produce an improved automated drilling system.

It is still another object of the present invention to produce an improved automated drilling system which is capable of operation in five axes and which will automatically assume a position with its cutting element normal to a contoured surface.

It is another object of the present invention to produce an improved automated drilling system which may be utilized with a plurality of work stations without requiring a plurality of numerical controllers.

It is yet another object of the present invention to provide an improved automated drilling system which demonstrates improved sturdiness and which will maintain a selected position throughout a drilling operation.

The foregoing objects are achieved as is now described. The automated tool positioning system of the present invention includes a plurality of work stations, each having a set of guide rails disposed along the length thereof. A single control device is provided and includes a set of guide rails adapted to be temporarily aligned with the guide rails of each work station. The control device is thus movable from work station to work station and operates with a novel tool support member which may be selectively positioned along any guide rail to support a cutting tool at a selected position on a particular work station. The tool support member includes arcuate bearing surfaces which permit the cutting tool to be rotated through a conical section having its vertex at the cutting point of the tool in response to the output of a workpiece surface detection circuit. In this manner, the cutting tool may be automatically and accurately positioned normal to the contoured surface of the workpiece.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

FIG. 1 is a perspective view of a section of the novel automated tool positioning system of the present invention;

FIG. 2 is an overhead schematic view of the novel automated tool positioning system of the present invention which illustrates the utilization of a single control device for multiple work stations;

DETAILED DESCRIPTION OF THE INVENTION

Figure 3:
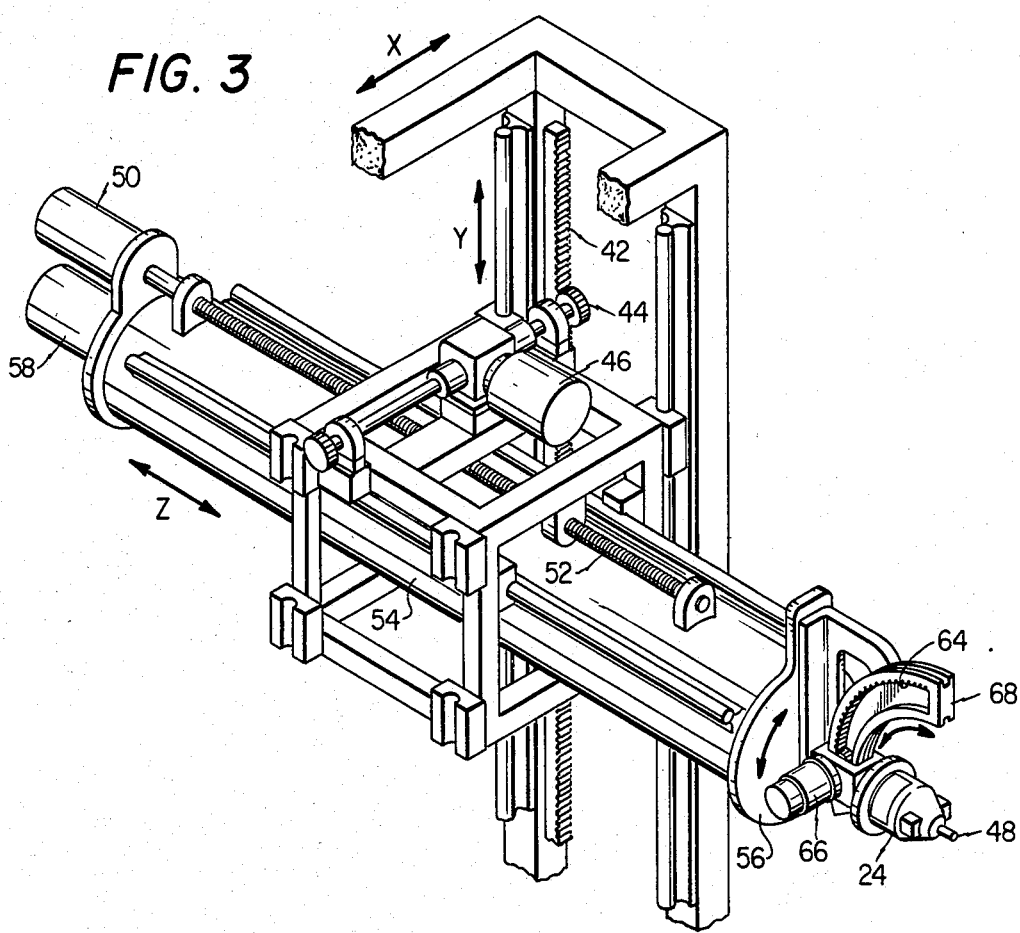
FIG. 3 is a perspective view of a preferred embodiment of the tool support member of the novel automated tool positioning system of the present invention.

With reference now to the figures and in particular with reference to FIG. 1 there is depicted a perspective view of a section of novel automated tool positioning system 10 of the present invention. As can be seen in FIG. 1, the section of automated tool positioning system 10 depicted includes two work stations generally indicated at numerals 12 and 14, each of which is capable of supporting a contoured workpiece such as workpiece 16. Workpiece 16 comprises a contoured section of an aircraft and may be constructed of a metallic or composite material. In the preferred embodiment of the present invention, each work station includes a pair of guide rails 18 and 20 which are utilized to movably support tool carriage 22. Tool carriage 22 serves to support and position cutting tool 24 in a manner which will be explained in detail herein.

Disposed between work stations 12 and 14 is control carriage 26 which serves to support control device 28. In a preferred embodiment of the present invention, control device 28 is implemented utilizing a standard numerical control device such as the Allen-Bradley Model 8200 controller or an equivalent component. Such standard numerical controllers typically include program formats which permit tool carriage 22 and cutting tool 24 to be positioned with an accuracy of one thousandth of an inch. The interconnections between control device 28 and carriage member 22 are omitted from FIG. 1 for the sake of clarity; however, those ordinarily skilled in the art will appreciate that standard X, Y and Z axes drive may be accomplished simply and efficiently utilizing rack and pinion drive systems which will feature precision racks with closed-loop position feedback.

As can be seen, control carriage 26 also includes a pair of guide rails 30 and 32 which are adapted to align with guide rails 18 and 20 and which thus permit tool carriage 22 to be entirely supported on control carriage 26. A second set of guide rails 34 and 36 permit control carriage 26 to be aligned with any one of several work stations as is illustrated with respect to FIG. 2.

Referring now to FIG. 2, there is depicted an overhead schematic view of novel automated tool positioning system 10 of the present invention which illustrates the utilization of a single control device 28 for use with multiple work stations. As can be seen in FIG. 2, control carriage 26 may be relocated utilizing guide rails 34 and 36 from its depicted position between work stations 12 and 14 to a similar position between work station 38 and work station 40. Guide rails 30 and 32 may be first aligned with guide rails 18 and 20 to permit tool carriage 22 to be moved onto control carriage 26 and then carriage station 26, together with tool support carriage 22 can be moved, via guide rails 34 and 36, to the second position depicted in FIG. 2. In this manner, the connections between tool carriage 22 and control device 28 may be maintained at all times and further, control device 28 may be utilized continuously rather than be allowed to sit idly while additional workpieces are brought to the work station. Thus, the efficiency of automated tool positioning system 10 is greatly enhanced and its reliability also increases due to the lack of necessity for removing and replacing connections between tool carriage 22 and control device 28.

With reference now to FIG. 3, there is depicted a perspective view of a preferred embodiment of cutting tool 24 and tool carriage 22 of novel automated tool positioning system 10 of the present invention. As can be seen, tool carriage 22 includes at least one rack gear 42 which is engaged by pinion gear 44 to permit cutting tool 24 to be raised and lowered within tool carriage 22. Pinion gear 44 is driven by motor 46, under the control of control device 28. Motor 46 may be implemented utilizing an electric or pneumatic motor and, as those ordinarily skilled in the art will appreciate, appropriate feedback sensors may be utilized to accurately position cutting tool 24 in this axis utilizing motor 46. Of course, tool carriage 22 may also be moved from left to right utilizing a similar rack and pinion gear system within the base of tool carriage 22. Such movement will also be governed by tool position signals generated by control device 28, in a manner well known in the art.

It is also necessary for cutting tool 24 to be moved along its longitudinal axis to permit penetration of workpiece 16 by cutting implement 48. Movement along this axis is accomplished utilizing a standard drill feed servo system.

Those ordinarily skilled in the art will appreciate that the three axes previously described are generally referred to as the X, Y and Z axes, and are also referred to as a mutually orthogonal set of Cartesian axes. The movement of tool carriage 22 in the X, Y and Z axis is generally sufficient to place cutting tool 24 in close proximity to the surface of workpiece 16; however, since workpiece 16 is a generally contoured structure it is desirable to rotate cutting tool 24 into a position such that cutting implement 48 is normal to the surface of workpiece 16 at the moment of penetration.

Hollow cylindrical member 54 serves to mount cutting tool 24 and is terminated at one end by rotating plate member 56. Rotating plate member 56 is rotatably mounted, utilizing standard rotatable bearing techniques, and is capable of rotation through three hundred sixty degrees, as driven by motor 58 and a shaft disposed within hollow cylindrical member 54.

Arcuate tool mounting member 62 is preferably mounted to rotating plate member 56 and serves as the mounting point for cutting tool 24. As can be seen, arcuate tool mounting member 62 includes a curved rack gear 64 and cutting tool 24 may be positioned at any point along arcuate tool mounting member 62 by the activation of motor 66, which serves to drive a pinion gear 68 (not shown).

An important feature of automated tool positioning system 10 is the fact that the radius center of arcuate tool mounting member 62 is located at the cutting point of cutting implement 48 and thus, the elongate body of cutting tool 24 can be made to describe an arc having its radius center at the cutting point of cutting implement 48. This movement, when combined with the 360 degree rotation capability of rotating plate member 56, can be seen to result in the elongate body of cutting tool 24 being rotated through a conical section having its vertex at the cutting point of cutting implement 48.

This particular feature is very important in that the utilization of rotation about such a programmed point eliminates the inherent positioning error of known systems and permits a greatly simplified form of program control to be utilized. Further, the highly curved nature of arcuate tool mounting member 62 permits cutting implement 48 to be rotated almost a full ninety degrees in either direction, allowing normalization to a surface having a high degree of contour.

Figure 4:
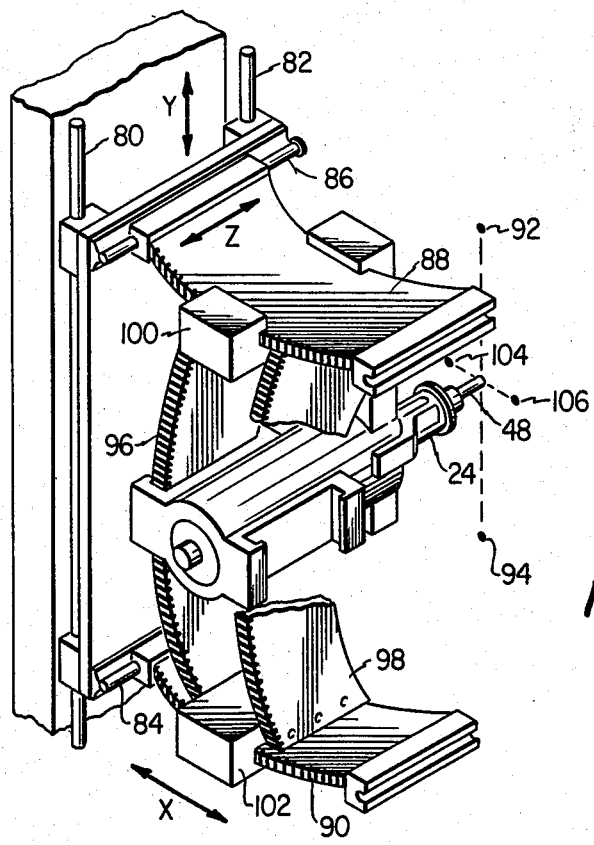
FIG. 4 is a perspective view of a second embodiment of the tool support member of the novel automated tool positioning system of the present invention.

Referring now to FIG. 4, there is depicted a perspective view of a second embodiment of tool carriage 22 and cutting tool 24 of automated tool positioning system 10 of the present invention. This embodiment is particularly useful in applications in which the contour of workpiece 16 does not exceed forty-five degrees. For the sake of clarity the actuating motors and electrical connections in FIG. 4 have also been omitted. As can be seen, cutting tool 24 is mounted within tool carriage 22 and may be raised or lowered in the Y direction utilizing rails 80 and 82. Again, translation of cutting tool 24 in the X direction is accomplished by the movement of tool carriage 22 in a similar manner to the movement of tool carriage 22 in the previously illustrated embodiment. Movement of cutting tool 24 in a Z direction is accomplished by movement along guide rails 84 and 86. Movement in the X, Y and Z axes may be accomplished utilizing rack and pinion systems or ball and screw drives, as those ordinarily skilled in the art will appreciate.

The rotation of cutting tool 24 through a conical section in this embodiment of the present invention is accomplished utilizing a plurality of arcuate bearing members. In the depicted embodiment, two pairs of arcuate bearing members are utilized. A first pair of arcuate bearing plates 88 and 90 serve to support cutting tool 24 in a horizontal plane and may be moved in the Z axis utilizing guide rails 84 and 86. The radius center of arcuate bearing plate 88 is located at point 92 and the radius center of arcuate bearing plate 90 is located at point 94. As can be seen, a line connecting the radius centers of arcuate bearing plates 88 and 90 will pass through the cutting point of cutting implement 48, which is mounted along the longitudinal axis of cutting tool 24.

A second pair of arcuate bearing plates 96 and 98 is mounted generally perpendicular to arcuate bearing plates 88 and 90 and serves to mount cutting tool 24. In the illustrated embodiment, a beveled gear edge along the edge of arcuate bearing plates 88 and 90 can be engaged with a drive gear contained within drive mechanism 100 and drive mechanism 102 and serves to rotate cutting tool 24 in a horizontal arc. Despite this rotation, the cutting point of cutting implement 48 remains on the depicted line between radius center 92 and radius center 94.

Arcuate bearing plate 96 has a radius center located at point 104 and arcuate bearing plate 98 has a radius center located at point 106. Again, the cutting point of cutting implement 48 is located on a line between radius center 104 and radius center 108, at the point where that line intersects the line between radius center 92 and radius center 94.

Cutting tool 24 may also be driven along the beveled gear edge of arcuate bearing plates 96 and 98 utilizing standard drive gears to describe a vertical arc. Again, the cutting point of cutting implement 48 remains at the point of the intersection of the lines between each pair of radius centers. Thus, those ordinarily skilled in the art should appreciate that by driving cutting tool 24 along the beveled gear edges of arcuate bearing plates 96 and 98 while driving arcuate bearing plates 96 and 98 along the beveled gears of arcuate bearing plates 88 and 90, cutting tool 24 can be made to rotate through a conical section having its vertex located at the cutting point of cutting implement 48.

In this manner, as described above with respect to FIG. 3, the rotation of cutting tool 24 may be utilized to position cutting tool 24 so that cutting implement 48 is normal to the surface of contoured workpiece 16. Again, unlike known tool positioning systems, the rotation of cutting tool 24 is constrained about the programmed point at the cutting point of cutting implement 48, minimizing any possible error and maximizing the ability of tool positioning system 10 to position cutting tool 24 normal to the surface of contour workpiece 16.

Figure 5:
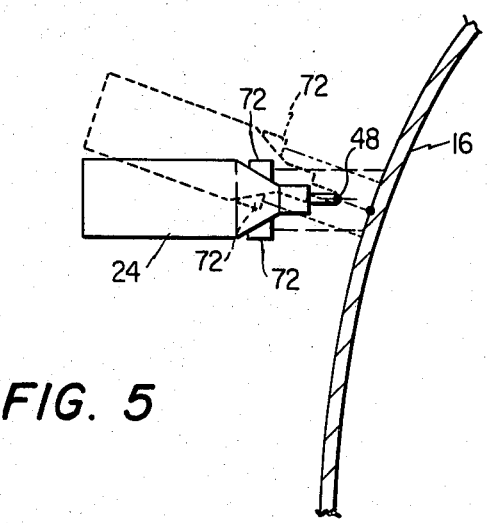
FIG. 5 is a partially schematic side view illustrating the novel rotational control of the automated tool positioning system of the present invention.
Figure 6:
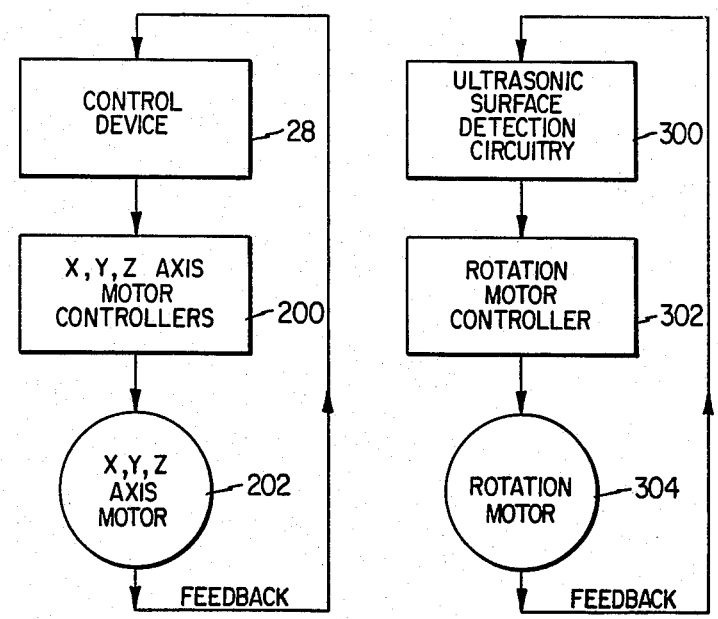
FIG. 6 is a simplified schematic diagram of the control circuitry of the automated tool positioning system of the present invention.

Referring now to FIGS. 5 and 6, the manner in which the position and rotation of cutting tool 24 is controlled may be illustrated. As can be seen in FIG. 5, cutting tool 24 is brought to a position proximate to the contoured surface of workpiece 16. A plurality of ultrasonic transceivers 72 are disposed in equidistant positions around the surface of cutting tool 24. By transmitting ultrasonic frequencies at the surface of workpiece 16 and receiving the return signals, the control circuitry may be simply utilized to minimize any path differences for this ultrasonic signal and thus position cutting tool 24 so that cutting implement 48 is normal to the surface of workpiece 16 at the desired point of entry. As illustrated in FIG. 5, unlike known tool positioning systems, cutting tool 24 will then rotate about the programmed point at the cutting point of cutting implement 48. Those skilled in the art will appreciate that alternate embodiments for rotating cutting tool 24 in a position normal to the surface of contoured workpiece 16 are also possible. For example, it is possible to utilize strain gauges or piezoelectric devices disposed around cutting implement 48 to ensure that cutting tool 24 is normal to the surface at the point of entry.

Referring now to FIG. 6, there is depicted a simplified schematic diagram of the control circuitry of novel automated tool positioning system 10 of the present invention. As can be seen, control device 28 is utilized to generate tool position signals which are coupled to X, Y and Z axis motor controllers 200 which in turn generate control signals to X, Y and Z motors 202. A positive feedback loop is then utilized to permit control device 28 to accurately position cutting tool 24 at a selected position above a selected surface on workpiece 16. Similarly, ultrasonic surface detection circuitry 300, including ultrasonic transceivers 72 is utilized to generate tool position signals to rotation motor controllers 302. Rotation motor controllers 302 then in turn generate control signals to rotation motors 304 and again, a feedback loop is utilized to ensure that accurate positioning of cutting tool 24 is accomplished.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An automated tool positioning system comprising:
   a plurality of work stations, each adapted to support a workpiece and having guide means disposed along one side thereof;

a single control device for generating tool position signals, said control device having guide means disposed along one side thereof;

means for selectively aligning said guide means of said single control device with said guide means of a selected one of said plurality of work stations comprising a guide rail disposed perpendicular to said guide means of said plurality of work stations wherein said single control device may be aligned adjacent to each of said plurality of work stations;

a tool support member movable along said guide means of a selected one of said plurality of work stations in response to said tool position signals for movably support and positioning a cutting tool in proximity to a selected surface on the selected workpiece, said cutting tool having a cutting implement mounted along the axis of said cutting tool with a cutting point extending outward therefrom; and means for rotating said cutting tool through a conical section having its vertex at said cutting point to position said cutting implement normal to the selected surface on the workpiece.

2. The automated tool positioning system according to claim 1 wherein said guide means disposed along one side of each of said plurality of work stations are each disposed in a parallel relationship.

3. The automated tool positioning system according to claim 1 wherein said single control device comprises an appropriately programmed computer.

* * * * *